246. RAILWAY SWITCHES & SIGNALS.

No. 819,322.  
PATENTED MAY 1, 1906.  
J. B. STRUBLE.  
ELECTRIC SIGNALING.  
APPLICATION FILED NOV. 16, 1901.

WITNESSES:  
Herbert Bradley.  
Fred Kirchner.

INVENTOR  
Jacob B. Struble  
by Darwin S. Wolcott Att'y.

UNITED STATES PATENT OFFICE.

JACOB B. STRUBLE, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRIC SIGNALING.

No. 819,322. Specification of Letters Patent. Patented May 1, 1906.

Application filed November 16, 1901. Serial No. 82,523.

*To all whom it may concern:*

Be it known that I, JACOB B. STRUBLE, a citizen of the United States, residing at Wilkinsburg, in the county of Allegheny and State of Pennsylvania, have invented or discovered certain new and useful Improvements in Electric Signaling, of which improvements the following is a specification.

The invention described herein relates to certain improvements in automatic electric signals for electric railways, and has for its object the overcoming the danger of a signal being operated by reason of leakage of the current employed in operating the cars or other foreign current and the improper energizing of the signal-controlling mechanism by such wild currents.

In general terms the invention consists in the employment of an alternating current in the track-circuits for energizing the translating device or relay controlling the signal-circuit which is controlled by neutral and polarized armatures of the track relay or relays.

The invention is hereinafter more fully described and claimed.

Figure 1:
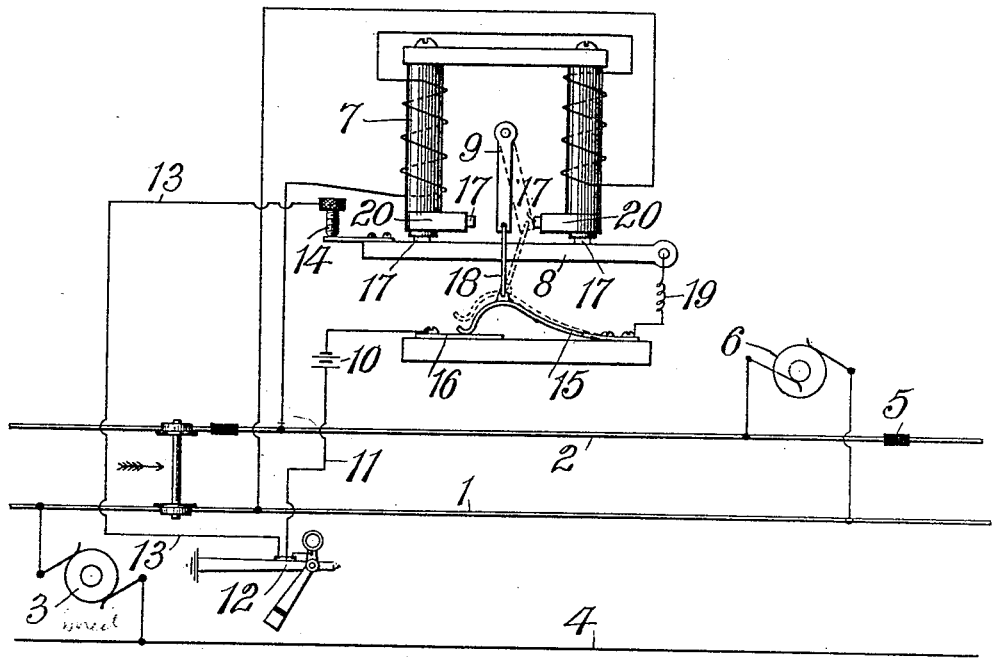
Figure 2:
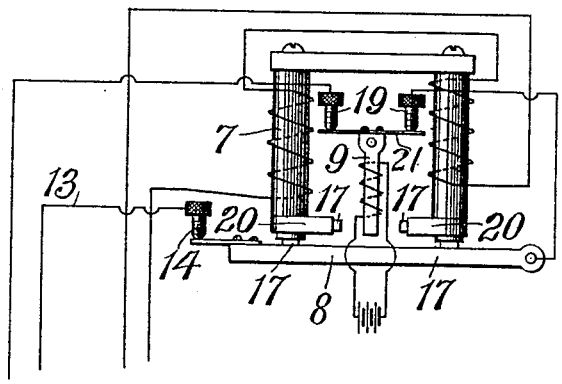
Figure 3:
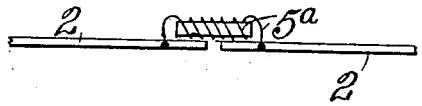

In the accompanying drawings, forming a part of this specification, Figure 1 is a diagrammatic view of a portion of a railway-track having my improvement applied thereto. Fig. 2 illustrates a modification of my improvement, and Fig. 3 is a detail view of a modified form of rail-joint.

In the practice of my invention one of the lines of rails, as 1, has its rails electrically bonded together and forms the return-conductor for the direct-current generator 3, which is connected to the trolley or the feed-wire 4. The other line of rails 2 is divided in signal sections or blocks by insulation 5, placed between the adjoining ends of rails at the ends of the sections or blocks. As an alternating current is employed in the track-circuit, provision may be made for utilizing both lines of rails as return-conductors for the direct or motor current by connecting the insulated or electrically-separated ends of the rail-sections 2 by inductive resistances 5ª, as shown in Fig. 3. As is well known, these resistances will prevent or retard the flow of alternating currents through them, but will not present any material resistance to the flow of direct currents. A generator 6 of alternating currents has one terminal connected to the track-sections and the opposite terminal to the electrically-connected line of rails. The track-sections 2 and the rails 1 form parts of a circuit which includes a relay or relays 7, having neutral and polarized armatures 8 and 9. The neutral armature 8 forms part of a circuit which, starting from the generator 10, consists of wire 11, signal-operating mechanism 12, wire 13, contact-point 14, armature 8, wire 19, spring 15, contact 16 to generator. The polarized armature 9, which may be either a permanent or electro magnet, is so pivotally mounted on the supporting-frame of the relay or other suitable support that its free end is between the pole-pieces of the relay. It is preferred that the pole-pieces 20 should have non-magnetic contact-blocks 17. The polarized armature is connected in any suitable manner, as by a link 18, to the contact-spring 15 of the signal-circuit, the several parts being so arranged that in normal position the spring bears on and has good electrical contact with the plate 16. When the armature 9 is swung to one side of its normal position, it will lift the contact-spring 15 from the plate 16, and thereby break the signal-circuit at that point.

As a neutral or soft armature will be attracted by an alternating field, (which is produced by the alternating track-current,) the armature 8 will be held against contact-point 14 as long as the track-circuit is complete; but as soon as the generator 6 is shunted by the wheels and axles of a car the armature will drop, breaking the signal-circuit, and the signal will go to "danger." As the magnetic alternations of the field, due to the alternating current in the track-circuit, are too rapid to overcome the inertia of the polarized armature, its position will not be changed under normal conditions. If, however, the relay becomes excited by the entrance of a direct current from any source, the polarized armature will be shifted thereby, lifting the spring 15 from the contact-plate 16, thereby breaking the signal-circuit and causing the signal to go to "danger." If the direct current should enter the relay while the neutral armature is down, the latter will be attracted so as to close the signal-circuit; but the latter will be immediately broken by the movement of the spring 15.

The operation of my improvement is as follows: When a train enters upon the rails 1 and 2, the generator 6 will be short-circuited, deënergizing the relay, so that the neutral armature 8 will drop and break the circuit through the signal, thereby permitting the same to go to "danger." If while the signal is in danger position and the train upon rails 1 and 2 a current from the source outside of the generator 6 should pass through the relay 7, it will be energized and the armature 8 will be lifted so as to close the signal-current through contact-point 14; but at the same time the armature 9 will be attracted to one or the other of the poles 20, dependent upon the direction in which the wild current enters the relay, and thereby operating through the link 18 to lift the spring 15 of its contact-plate and break the signal-circuit at that point, so that the signal will not be shifted from danger position by the entrance of the wild circuit through the relay.

As shown in Fig. 2, the polarized armature may be formed by an electromagnet, and in lieu of the make-and-break construction shown in Fig. 1 a spring-plate 21 may be attached to the armature and contact-points 19, forming portions of the signal-circuit so arranged as to be normally in contact with the plate 21. In this construction the contact-plate 21 is normally in contact with the points 19, so that the signal-circuit will be complete at these points. When the relay is short-circuited by the entrance of a train on a section controlled thereby, the neutral armature 8 will drop and break the signal-circuit at contact-point 14. If now a wild current should pass through the coil of the relay 7, the armature 9 would be attracted to one or the other of the poles 20, and thereby shift the plate 21 out of contact with one of the pins 19, and thereby form a break in the signal-circuit.

I claim herein as my invention—

1. In a signaling system, the combination of a closed track-circuit, an alternating-current supply for said track-circuit, a relay in circuit with the closed track-circuit, a polarized and a neutral armature controlled by the relay and a signal-circuit controlled by the armatures.

2. In an electric signaling system the combination of a series of rail-sections having adjacent ends insulated or electrically separated from each other to form track-circuits, an alternating-current supply for said track-circuits, and inductive resistances connecting the rails included in adjacent track-circuit whereby alternating currents are confined to the track-circuits and direct or motor currents are permitted to flow from rail-section to rail-section.

3. In an electric railway-signaling system, the combination of a series of rail-sections having adjacent ends insulated or electrically separated from each other to form track-circuits, an alternating-current supply for said track-circuits, inductive resistances connecting adjacent ends of rail-sections and forming a path from section to section for direct currents, and a source of direct current having one pole connected to the line of rails, substantially as set forth.

4. In a signaling system, the combination of a closed track-circuit, an alternating-current supply therefor, a signal, and means to control the operation of said signal, said means responding to the absence or presence of the alternating current in the track-circuit and not responding to continuous or direct currents traversing said track-circuit in its control of the signal.

5. In a signaling system, the combination with a closed track-circuit, of an alternating-current supply therefor, a signal, and means included in said circuit to govern the operation of said signal, having provision to cause said signal to be operated by its response to the presence or absence of the alternating current traversing said track-circuits and to prevent said signal being operated by continuous or direct currents traversing said track-circuit.

6. In a signaling system, the combination of a closed track-circuit, a source of alternating-current supply therefor, a signal, means to govern the operation of said signal which are responsive to the presence or absence of alternating current in the track-circuit, and means to prevent the operation of said signal by continuous or direct currents traversing said track-circuit.

7. In a signaling system, the combination of a closed track-circuit, an alternating-current supply therefor, a signal, and a translating device responding to the absence or presence of the alternating current in the track-circuit, which governs the operation of said signal and having provision to prevent said signal being operated by continuous or direct currents traversing said track-circuit.

8. In a signaling system, the combination of a normally closed track-circuit, a source of alternating-current supply therefor, a signal and circuit therefor, and means for controlling said signal-circuit, said means being operated through the alternating current in the track-circuit and having provision to prevent its controlling the signal-circuit by direct or continuous currents traversing the track-circuit.

9. In a signal system, the combination of a closed track-circuit, an alternating-current supply therefor, a signal, a circuit therefor, and a translating device in circuit with the track-circuit and responding to the absence or presence of alternating current in the track-circuit, said translating device affecting the signal-circuit to have the signal moved to "danger" when responding to the absence of alternating currents and also preventing the signal moving from "danger" to "safety" by direct current in the track-circuit.

10. In a signaling system, the combination with a closed track-circuit, of a source of alternating-current supply a signal, a circuit therefor, and means for controlling said circuit, said means responding to the presence or absence of the alternating current in the track-circuit in its control of the signal-circuit and unresponsive in its control of the signal-circuit to continuous or direct current in the track-circuit when alternating current is not in the track-circuit.

11. In a signaling system for use on railways employing an electric current as a motive power and the track as a return for the electric current, the combination of a circuit which includes portions of both rails, an alternating-current supply for such circuit, and a translating device responsive to the presence or absence in it of the alternating current in said track-circuit to control a signal and not responsive to the motive-power current or continuous or direct currents in said circuit in its control of a signal.

12. In a signaling system for use on railways employing a direct current as a motive power and the track as a return for the direct current, the combination of a circuit which includes portions of both rails, an alternating-current supply for such circuit, and a translating device responding to the presence or absence in it of alternating current in said circuit in its control of a signal and not responding to continuous or direct currents in said circuit in its control of a signal.

13. In a signaling system the combination of a track-circuit, a constant source of alternating-current supply therefor, a signal, and means to control the operation of said signal, said means responding to the absence or presence of the alternating current in the track-circuit and not responding to continuous or direct currents traversing said track-circuit in its control of the signal.

14. In a signaling system the combination of a closed track-circuit, an alternating-current supply therefor, a signal, and means to control the operation of said signal, said means responding to the absence or presence of the alternating current in the track-circuit and not responding to continuous or direct currents traversing said track-circuit when the signal is at "danger."

15. In a signaling system the combination of a closed track-circuit, a constant source of alternating-current supply therefor, a signal and means to control the operation of said signal, said means responding to the absence or presence of the alternating current in the track-circuit and not responding to continuous or direct currents traversing said track-circuit when the signal is at "danger."

16. In combination with a railway the rails of which are employed as a return for the propulsion-current of the car, a generator for the propulsion-current, and a signaling system, said system comprising a series of track-circuits, an alternating-current supply for each of said track-circuits, and means for restraining the alternating current to the track-circuits but permitting the propulsion-current to pass from the track-rails of a track-circuit to the track-rails of another track-circuit.

17. In combination with a railway one of the rails of which is electrically continuous and the other of which is divided into sections, reactance-coils connecting adjacent ends of the rail-sections, a direct-current generator having one pole connected with the rails, and a signaling system, said system comprising track-circuits, an alternating-current supply for each track-circuit and a translating mechanism operated from the alternating current of the track-circuit.

18. In combination, a source of electric energy, a distribution-circuit for said source of energy, motor-vehicles operated from said source of energy, a number of circuits electrically independent of each other for controlling signaling devices supplied with current differing in character from the current supplied from the other source of energy, signaling devices, and means carried by a vehicle for electrically isolating a signal when the vehicle moves into one of said independent circuits.

19. A signaling system for electric railways employing the track as a return for the car-propulsion current, having in combination a number of circuits electrically independent and each formed in part by the track, a source of current for each circuit, a translating device for each circuit responsive to control a signaling device to the current intended for its operation and not to the propulsion-current, and the signaling devices.

20. In an electric-railway system, a source of power-current, vehicles operated thereby, a power-circuit comprising two conductors extending from the power-current source to the cars, one of which is formed by the track, a signal-circuit of which the track forms both sides, a source of current for said signal devices connected to both rails of the track, and signal devices completing such circuit.

21. In an electric-railway system, a source of power-current of one character, vehicles operated thereby, a circuit for said power-current comprising two conductors with which the cars make moving contact, one of which is formed by the track, a signal-circuit of which the rails of the track forms both sides, a source of current for said signal-circuit furnishing current of a different character and connected to both rails, and signal devices completing such signal-circuit.

22. In an electric-railway system, a source of power-current, a power-circuit in which the track forms one side and conducts current in the same direction, signaling-circuits formed by the track in which the two rails conduct current in opposite directions consisting of a series of rail-sections having adjacent ends electrically separated from each other and inductive resistances connecting said adjacent ends and forming a path from section to section for the power-currents.

In testimony whereof I have hereunto set my hand.

JACOB B. STRUBLE.

Witnesses:
  DARWIN S. WOLCOTT,
  H. M. CORWIN.